United States Patent
Sato

(10) Patent No.: US 8,976,394 B2
(45) Date of Patent: Mar. 10, 2015

(54) PRINTING SYSTEM AND CONTROL METHOD USING FIRST AND SECOND USER INTERFACES

(71) Applicant: Canon Kabushiki Kaisha, Tokyo (JP)

(72) Inventor: Eiichi Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/933,520

(22) Filed: Jul. 2, 2013

(65) Prior Publication Data
US 2013/0293915 A1 Nov. 7, 2013

Related U.S. Application Data

(63) Continuation of application No. 12/945,291, filed on Nov. 12, 2010, now Pat. No. 8,508,777.

(30) Foreign Application Priority Data

Dec. 8, 2009 (JP) ................................ 2009-278942

(51) Int. Cl.
*G06F 3/12* (2006.01)
*G06K 15/00* (2006.01)

(52) U.S. Cl.
CPC .......... *G06K 15/4025* (2013.01); *G06F 3/1204* (2013.01); *G06F 3/1264* (2013.01); *G06F 3/1282* (2013.01)
USPC ........ 358/1.15; 358/1.13; 358/1.14; 358/1.18

(58) Field of Classification Search
USPC .............. 358/1.13–1.15, 1.18; 399/88, 81–83
See application file for complete search history.

(56) References Cited

U.S. PATENT DOCUMENTS

| 4,717,927 A | 1/1988 | Sato |
| 4,860,034 A | 8/1989 | Watanabe et al. |
| 5,172,142 A | 12/1992 | Watanabe et al. |
| 5,461,469 A | 10/1995 | Farrell et al. |
| 5,905,511 A | 5/1999 | Watanabe et al. |
| 6,549,299 B1 | 4/2003 | Allen et al. |
| 7,092,963 B2 * | 8/2006 | Ryan et al. ............................ 1/1 |
| 7,206,087 B2 * | 4/2007 | Ryan et al. ................... 358/1.15 |
| 7,869,065 B2 | 1/2011 | Sugimoto et al. |
| 8,099,038 B2 * | 1/2012 | Matoba ......................... 399/404 |
| 8,170,438 B2 * | 5/2012 | Mikami .......................... 399/88 |
| 8,240,656 B2 * | 8/2012 | Iizuka ........................... 271/111 |

(Continued)

FOREIGN PATENT DOCUMENTS

| JP | 02-038261 A | 2/1990 |
| JP | 2002-108139 A | 4/2002 |

(Continued)

*Primary Examiner* — Dennis Dicker
(74) *Attorney, Agent, or Firm* — Fitzpatrick, Cella, Harper & Scinto

(57) ABSTRACT

The present invention provides a printing system provided with a printing apparatus and a post-processing apparatus, and a control method thereof, wherein, when an instruction is given to execute an off-line job in which a post-process by the post-processing apparatus is performed without printing by the printing apparatus (S11), a screen for selecting an off-line job using the post-processing apparatus can be displayed by the second user interface of the post-processing apparatus and the off-line job can be selected (S12), and, in response to an instruction to start the off-line job from the first user interface of the printing apparatus (S16), the off-line process is executed (S17 and S18).

9 Claims, 9 Drawing Sheets

(56) References Cited

U.S. PATENT DOCUMENTS

| | | |
|---|---|---|
| 8,243,299 B2 | 8/2012 | Okada |
| 8,274,671 B2 * | 9/2012 | Kanai ........................... 358/1.13 |
| 8,422,072 B2 * | 4/2013 | Okamoto et al. ............... 358/1.9 |
| 2002/0016803 A1 | 2/2002 | Ryan et al. |
| 2003/0142343 A1 * | 7/2003 | Bezenek ....................... 358/1.15 |
| 2004/0098665 A1 | 5/2004 | Kasahara et al. |
| 2004/0190057 A1 | 9/2004 | Takahashi et al. |
| 2005/0275869 A1 | 12/2005 | Yokoyama |
| 2006/0238786 A1 | 10/2006 | Sakura et al. |
| 2006/0262347 A1 | 11/2006 | Ono |
| 2008/0055626 A1 | 3/2008 | Root et al. |
| 2009/0207446 A1 | 8/2009 | Akashi |
| 2010/0007922 A1 * | 1/2010 | Sato et al. ..................... 358/1.15 |
| 2012/0250088 A1 * | 10/2012 | Mikami ....................... 358/1.15 |

FOREIGN PATENT DOCUMENTS

| | | |
|---|---|---|
| JP | 2004-145200 | 5/2004 |
| JP | 2005-103985 A | 4/2005 |
| JP | 2008-149686 A | 7/2008 |
| JP | 2008-165129 A | 7/2008 |
| JP | 2009-091065 A | 4/2009 |

* cited by examiner

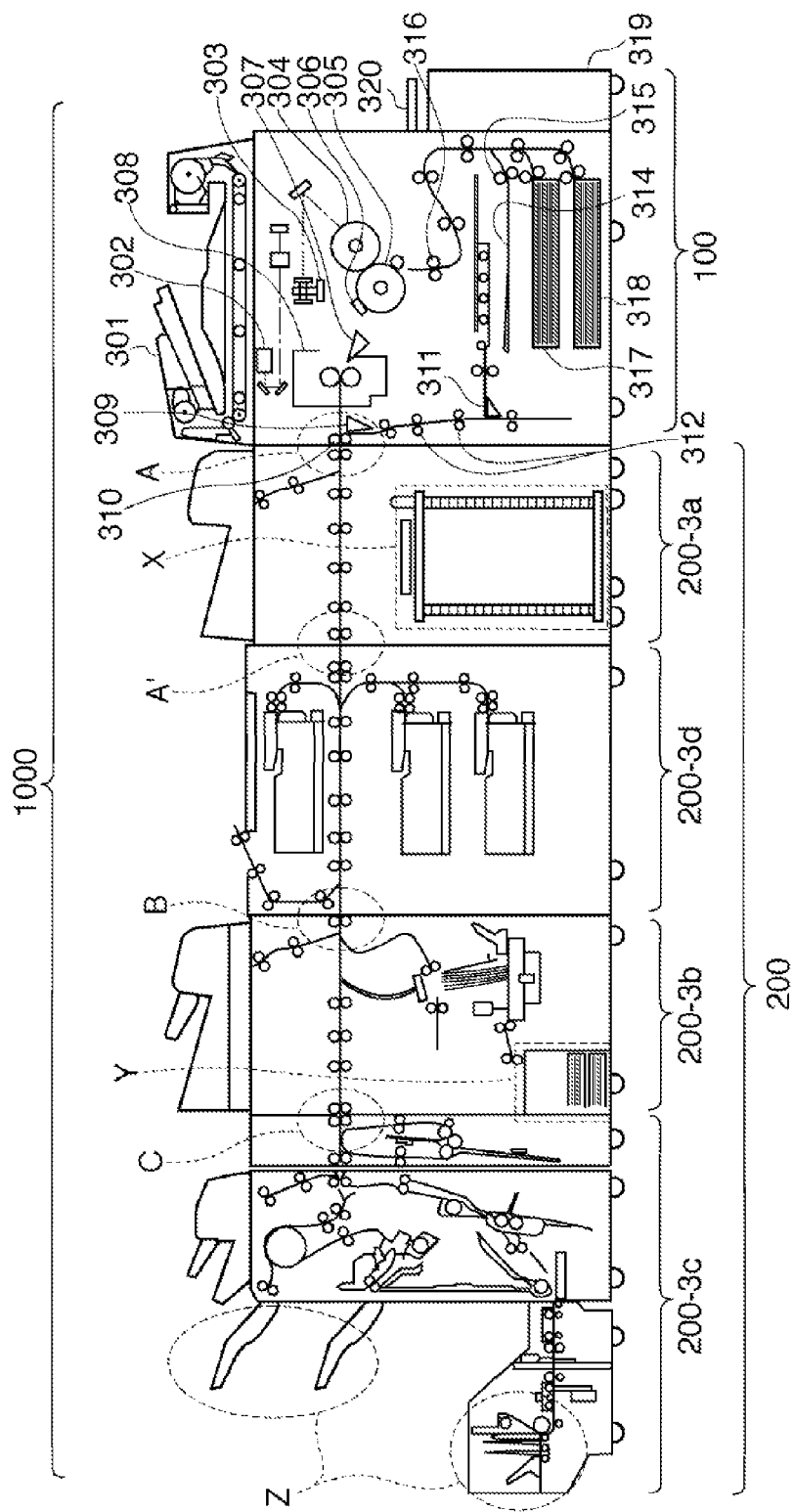

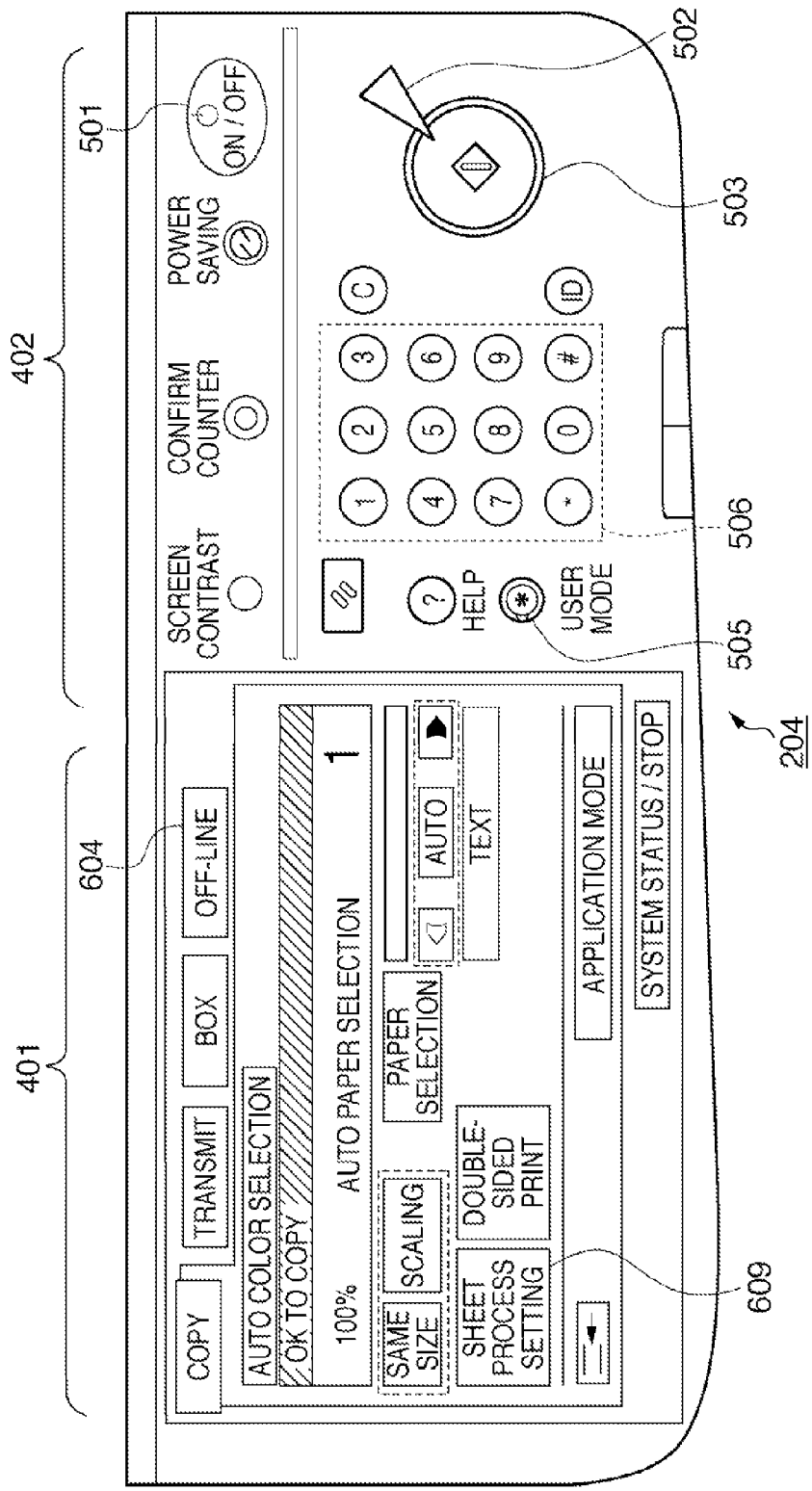

FIG. 5

SELECTION OF SHEET PROCESS

PLEASE SELECT TYPE OF SHEET PROCESS TO
BE EXECUTED FOR PROCESSING TARGET PRINTING JOB

| STAPLE | PUNCHING | CUTTING |
| SHIFT DISCHARGE | SADDLE STITCHING | FOLDING |
| GLUE BINDING 1 (CASE BINDING) | INSERTION |
| GLUE BINDING 2 (PAD BINDING) | |

CANCEL   OK

FIG. 6

SELECTION OF OFF-LINE PROCESS

PLEASE SELECT TYPE OF SHEET PROCESS TO
BE EXECUTED FOR OFF-LINE JOB

| STAPLE | PUNCHING | CUTTING |
| SHIFT DISCHARGE | SADDLE STITCHING | FOLDING |
| GLUE BINDING 1 (CASE BINDING) | INSERTION |
| GLUE BINDING 2 (PAD BINDING) | PAPER FEED — 601 |

CANCEL   OK

PRINTING SYSTEM AND CONTROL METHOD USING FIRST AND SECOND USER INTERFACES

This is a continuation of U.S. patent application Ser. No. 12/954,291, filed Nov. 12, 2010.

BACKGROUND OF THE INVENTION

1. Field of the Invention

The present invention relates to a printing system that includes a printing apparatus, a post-processing apparatus, and a control method thereof.

2. Description of the Related Art

In recent years, a print-on-demand (POD) printing system has been proposed that includes an electrophotographic or inkjet printing apparatus and a post-processing apparatus, and that performs a bookbinding process on sheets that have been printed by the printing apparatus (U.S. Publication No. 2004-0190057). With this sort of POD printing system, printing plate making processes and other complicated tasks essential for a conventional bookbinding process can be significantly reduced.

This sort of printing system has an in-line mode where a printing process by a printing apparatus and a post-process on sheets that have been printed in the printing process are performed successively and an off-line mode in which only a post-process is performed without the involvement of a printing process by a printing apparatus. A system has also been proposed in which, in this off-line mode, where a second user interface provided on the post-processing apparatus, and not a first user interface provided on the printing apparatus, is used to perform a post-process on sheets set in a paper feed unit (Japanese Patent Laid-Open No. 2004-145200).

However, the above-described POD printing system still has many problems in terms of practicability. For example, it is desirable that the first user interface of the printing apparatus can instruct a post-process both in the in-line mode and the off-line mode. Furthermore, it is necessary that the post-process instructed by the first user interface is properly controlled according to whether the process is a process in the in-line mode or a process in the off-line mode.

Meanwhile, it is desirable that the second user interface of the post-processing apparatus can instruct at least one of post-processes in the off-line mode that can be instructed by the first user interface. Furthermore, it is necessary that control is properly performed such that a post-process in the off-line mode instructed by the first user interface and that by the second user interface do not conflict with each other.

Moreover, it is desirable that, even when the printing apparatus cannot be used due to power constraint or any other troubles, the second user interface of the post-processing apparatus can be used to perform a post-process by instructing that post-processing apparatus to perform the post-process.

SUMMARY OF THE INVENTION

An aspect of the present invention is to eliminate the above-mentioned problems with the conventional technology.

The present invention provides a printing system in which a first user interface of a printing apparatus can instruct post-processes both in the in-line mode and the off-line mode, and a second user interface of a post-processing apparatus can instruct at least one of post-processes in the off-line mode that can be instructed by the first user interface, and a control method thereof.

The present invention in its first aspect provides a printing system including a printing apparatus and a post-processing apparatus, comprising an off-line job execution unit configured to execute an off-line job in which a post-process by the post-processing apparatus is performed without printing by the printing apparatus; an in-line job execution unit configured to execute an in-line job in which printing by the printing apparatus and a post-process by the post-processing apparatus are performed; a first user interface configured to receive a request to execute the in-line job and the off-line job; and a second user interface provided on the post-processing apparatus, which is different from the first user interface, configured to receive an off-line job using the post-processing apparatus; wherein the first user interface is provided on the printing apparatus.

The present invention in its second aspect provides a method for controlling a printing system including a printing apparatus and a post-processing apparatus, comprising the steps of executing an off-line job in which only a post-process by the post-processing apparatus is performed without involvement of printing by the printing apparatus; executing an in-line job in which printing by the printing apparatus and a post-process by the post-processing apparatus are performed; receiving a request to execute the in-line job and the off-line job; and receiving an off-line job using the post-processing apparatus.

According to the present invention, the first user interface of the printing apparatus can instruct post-processes both in the in-line mode and the off-line mode. Furthermore, the second user interface of the post-processing apparatus can instruct at least one of post-processes in the off-line mode that can be instructed by the first user interface.

Further features of the present invention will become apparent from the following description of exemplary embodiments with reference to the attached drawings.

BRIEF DESCRIPTION OF THE DRAWINGS

FIG. 3 is a cross-sectional view showing the configuration of the printing system according to this embodiment.

FIG. 4 is an external view of an operation unit of the printing apparatus.

FIG. 5 is a view showing a display example of a setting screen for enabling the user to select the type of a sheet process.

FIG. 6 is a view showing a display example of a setting screen of the type of a sheet process in the off-line job.

DESCRIPTION OF THE EMBODIMENTS

Figure 1:
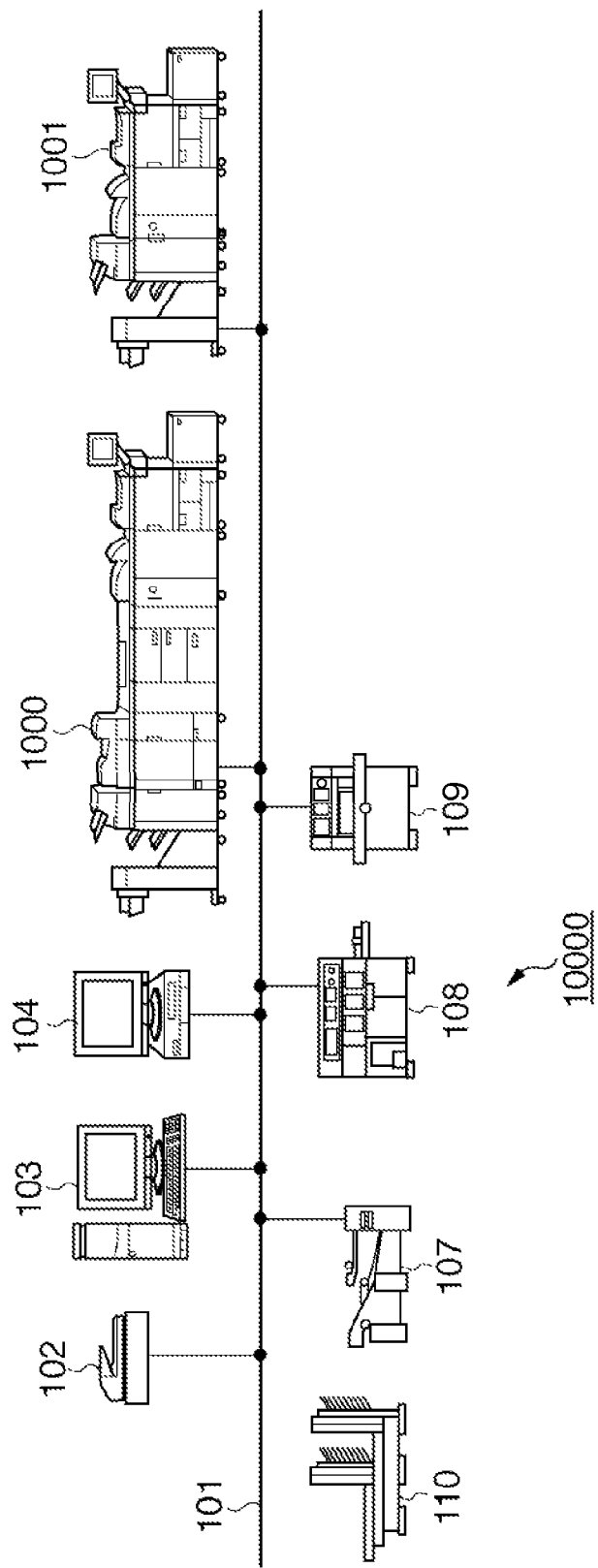
FIG. 1 is a view showing the configuration of a POD system according to this embodiment.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

The same constituent elements are denoted by the same reference numerals, and a description thereof has been omitted.

FIG. 1 is a view showing the configuration of a POD system according to this embodiment.

A POD system 10000 has printing systems 1000 and 1001, a scanner 102, a server computer 103 (PC 103), and a client computer 104 (PC 104), and these constituent elements are connected via a network 101. Furthermore, the POD system 10000 has a sheet folding apparatus 107, a case binding apparatus 108, a trimmer 109, a saddle stitching apparatus 110, and the like.

The PC 103 manages data exchanges among the various apparatuses connected to the network 101. The PC 104 transmits image data via the network 101 to the printing systems 1000 and 1001 and the PC 103.

Furthermore, the sheet folding apparatus 107 performs a folding process on printed sheets. The case binding apparatus 108 performs a case binding process on printed sheets. The trimmer 109 performs a cutting process on printed sheets for each bundle of sheets constituted by a plurality of sheets. The saddle stitching apparatus 110 performs a saddle stitching process on printed sheets.

When using the sheet folding apparatus 107, the case binding apparatus 108, the trimmer 109, or the saddle stitching apparatus 110, a user takes out sheets that have been printed by the printing system 1000 or the printing system 1001, sets the sheets in any one of these apparatuses that is to be used, and causes the apparatus to perform the process. Furthermore, among the plurality of apparatuses included in the POD system 10000, apparatuses other than the saddle stitching apparatus 110 are connected to the network 101, and are configured to be capable of data communication with each other.

Here, the printing system 1001 is equipped with the same configuration as that of the printing system 1000, but this is not a limitation. Furthermore, the configuration of this embodiment can be achieved if at least one of the printing systems is present. In this embodiment, it is assumed that at least the printing system 1000 has various constituent elements described below.

Figure 2:
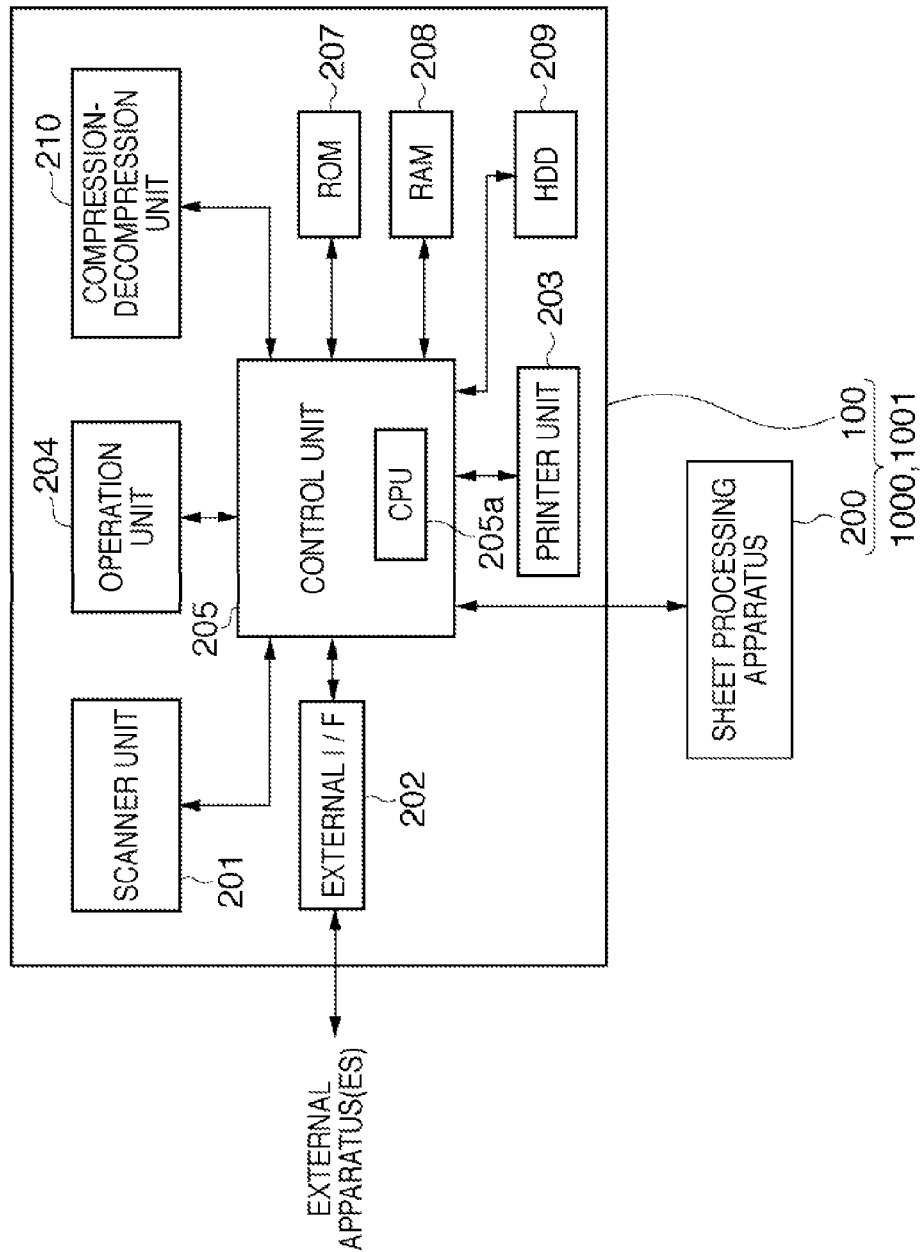
FIG. 2 is a block diagram showing the configuration of a printing system according to this embodiment.

FIG. 2 is a block diagram showing the configuration of the printing system 1000 (1001) according to this embodiment. Here, the case of the printing system 1000 will be described, but the printing system 1001 also has a similar configuration.

The printing system 1000 has a printing apparatus 100 and a sheet processing apparatus 200. Here, in this embodiment, a multi function peripheral (MFP) having multiple functions such as a copy function and a printer function will be described as an example of the printing apparatus 100. However, the printing apparatus 100 may be a single-function printing apparatus having only a copy function or only a printer function.

The printing apparatus 100 can be connected to any number of sheet processing apparatuses 200. The printing system 1000 is configured so that a sheet process on sheets that have been printed by the printing apparatus 100 can be performed by the sheet processing apparatus 200 connected to the printing apparatus 100. Here, it is also possible for the printing system 1000 to be configured only from the printing apparatus 100, without being connected to the sheet processing apparatus 200. The sheet processing apparatus 200 is configured to be capable of communication with the printing apparatus 100, and can perform a sheet process as described later upon receiving instructions from the printing apparatus 100.

Next, the configuration of the printing apparatus 100 will be described. A scanner unit 201 reads images on documents, converts the images to image data, and then transfers the image data to other units. An external I/F 202 performs data exchanges with other apparatuses connected to the network 101. A printer unit 203 prints images on sheets based on input image data. An operation unit 204 has a hard key input section (key input section) and a touch panel section (described later), and receives instructions from the user via these sections. The operation unit 204 performs various displays on the touch panel section.

A control unit 205 has a CPU 205a, and comprehensively controls, for example, the processes and operations of the various units included in the printing system 1000. That is to say, it controls the operations of both the printing apparatus 100 and the sheet processing apparatus 200 connected to the printing apparatus 100. A ROM 207 stores various computer programs to be executed by the control unit 205. For example, the ROM 207 stores programs for causing the control unit 205 to execute various processes of flowcharts (described later), and display control programs necessary for displaying various setting screens (described later). Furthermore, the ROM 207 stores a program for executing an operation in which page description language (PDL) code data received from the PC 103, the PC 104, or the like is interpreted by the control unit 205 and developed into raster image data. Additionally, the ROM 207 stores a boot sequence, font information, and the like. A RAM 208 stores image data transmitted from the scanner unit 201 and the external I/F 202, and various programs and setting information loaded from the ROM 207. Furthermore, the RAM 208 stores information relating to the sheet processing apparatus 200 (information relating to the number (0 to n) of sheet processing apparatuses 200 connected to the printing apparatus 100 and functions of each of the sheet processing apparatuses 200, the connection sequence of the sheet processing apparatuses 200, and the like). A hard disk drive (HDD) 209 is configured from a hard disk and drive units or the like reading and writing data from and to the hard disk. The HDD 209 is a large capacity storage device capable of storing image data that has been input from the scanner unit 201 or the external I/F 202 and compressed by a compression-decompression (CODEC) unit 210. Based on instructions from the user, the control unit 205 can cause the printer unit 203 to print image data stored in the HDD 209. Furthermore, based on instructions from the user, the control unit 205 can transmit image data stored in the HDD 209 via the external I/F 202 to the PC 103 or other external apparatuses of the printing system 1000. Furthermore, the control unit 205 can obtain image data from the PC 103 or other external apparatuses of the printing system 1000 via the external I/F 202 in a similar manner. Furthermore, via the external I/F 202, the control unit 205 can search external apparatuses connected to the network 101. The compression-decompression unit 210 performs compression and decompression operations on image data and the like stored in the RAM 208 and the HDD 209 using various compression formats such as JBIG and JPEG.

FIG. 3 is a cross-sectional view showing the configuration of the printing system 1000 according to this embodiment.

An auto document feeder (ADF) 301 sequentially separates a bundle of documents that have been set on a loading face of a document tray, in page order from the first page of document, and transports these documents onto a document platen glass so that a scanner 302 scans the documents. The scanner 302 reads images of the documents that have been transported onto the document platen glass, and converts the images to image data using a CCD. These constituent elements correspond to the scanner unit 201.

Next, the configuration of the printer unit 203 will be described. A light beam such as laser light modulated according to image data is made incident on a rotating multifaceted mirror (polygon mirror, etc.) 303, and irradiated via a reflection mirror onto a photosensitive drum 304 as a reflected scanning light. An electrostatic latent image formed by this light beam on the photosensitive drum 304 is developed with a toner, and a toner image is transferred to a sheet material sticking onto a transfer drum 305. A full color image is formed by successively performing this series of image formation processes for toner of yellow (Y), magenta (M), cyan (C), and black (K). After the four times of these image formation processes, the sheet material on the transfer drum 305 on which a full color image has been formed is separated by a separation pawl 306, and transferred by a pre-fixing transportation unit 307 to a fixing unit 308. The fixing unit 308 is configured from a combination of rollers and a belt, includes an inbuilt heat source such as a halogen heater, and uses heat and pressure to melt and fix the toner on the sheet material to which the toner image has been transferred. A discharge flapper 309 is configured to be capable of swinging about a swinging shaft to prescribe a transport direction of the sheet material. When the discharge flapper 309 has swung in a clockwise direction in the diagram, the sheet material is transported in a straight line and discharged outside the apparatus by discharge rollers 310. Through the series of sequences as described above, the control unit 205 controls the printing apparatus 100 so as to perform single-sided printing.

Meanwhile, when forming images on both sides of a sheet material, the discharge flapper 309 swings in a counterclockwise direction in the diagram such that the route of the sheet material is altered downward and the sheet material is transported into a double-sided transportation unit. The double-sided transportation unit is provided with a reversing flapper 311, reversing rollers 312, a reversing guide 313, and a double-sided print tray 314. The reversing flapper 311 swings about a swinging shaft to prescribe a transport direction of the sheet material. When processing a double-sided print job, the control unit 205 performs control such that a sheet on which printing has been performed on a first side thereof is transported via the reversing rollers 312 to the reversing guide 313 by swinging the reversing flapper 311 in a counterclockwise direction in the diagram. Then, the reversing rollers 312 are temporarily stopped in a state where the trailing edge of the sheet material is held between the reversing rollers 312, and the reversing flapper 311 is then swung in the clockwise direction in the diagram. Moreover, the reversing rollers 312 are rotated in a reverse direction. Accordingly, control is performed such that the sheet is switched back, and guided to the double-sided print tray 314 in a state where the trailing edge and the leading edge of that sheet are swapped. The sheet material is temporarily stacked in the double-sided print tray 314, and then transported by paper re-feed rollers 315 into registration rollers 316. At that time, the sheet material is transported in a state where a side opposite the first side in the previous transfer process faces the photosensitive drum 304. Then, a second image is formed on the second side of the sheet as in the above described process. In this manner, images are formed on both sides of the sheet material, and, after the fixing process, the sheet material is discharged via the discharge rollers 310 from inside the main unit of the printing apparatus 100 to outside the apparatus. Through the series of sequences as described above, the control unit 205 controls the printing apparatus 100 so as to perform double-sided printing.

Furthermore, the printing apparatus 100 has paper feed units that accommodate sheets required for a printing process. The paper feed units include paper feed cassettes 317 and 318 (e.g., each of these can accommodate 500 sheets), a paper feed deck 319 (e.g., this can accommodate 5000 sheets), a manual feed tray 320, and the like. Various sheets of different sizes and materials can be separately set in each paper feed unit of the paper feed cassettes 317 and 318 and the paper feed deck 319. Furthermore, various sheets including special sheets such as OHP sheets can be set in the manual feed tray 320. Each of the paper feed cassettes 317 and 318, the paper feed deck 319, and the manual feed tray 320 is provided with paper feed rollers, and the sheets are successively transported by the paper feed rollers sheet by sheet.

Next, the sheet processing apparatuses 200 shown in FIG. 3 will be described. As the sheet processing apparatus 200 in the printing system 1000 of this embodiment, any number of any types of apparatuses can be linked as long as sheets can be transported via a sheet transport path from an upstream apparatus to a downstream apparatus. For example, as shown in FIG. 3, a large volume stacker 200-3a, an inserter 200-3d, a glue binding apparatus 200-3b, and a saddle stitching apparatus 200-3c can linked in order of proximity to the printing apparatus 100, and each of these apparatuses can be used selectively in the printing system 1000. Furthermore, each of the sheet processing apparatuses 200 is provided with a sheet discharge unit, and the user can take out sheets on which the sheet process has been performed, from the sheet discharge unit of each of the sheet processing apparatuses.

From candidates of types of sheet processes that can be performed by the sheet processing apparatus 200 connected to the printing apparatus 100, the control unit 205 receives an execution request for a type of a sheet process desired by the user together with a printing execution request via the operation unit 204. Then, in response to receiving from the user via the operation unit 204 the printing execution request for a processing target job, the control unit 205 causes the printer unit 203 to perform a printing process required for that job. Then, the control unit 205 transports sheets for the job on which the printing process has been performed via the sheet transport path to a sheet processing apparatus that can perform the sheet process desired by the user, and causes that sheet processing apparatus to perform the sheet process.

For example, it is assumed that, in the case where the printing system 1000 is configured as the system shown in FIG. 3, the processing target job for which a printing execution request has been received from the user is a job in which a large volume stacking process is to be performed using the large volume stacker 200-3a. This job is referred to as a "stacker job". When processing the stacker job using the system configuration in FIG. 3, the control unit 205 causes sheets for this job that have been printed by the printing apparatus 100 to pass a point A in FIG. 3, and then to be transported into the large volume stacker 200-3a. Subsequently, the control unit 205 causes the large volume stacker 200-3a to perform a stacking process on the sheets for this job. Then, the control unit 205 causes a discharge destination X inside the large volume stacker 200-3a to hold the sheets (printed materials) that have been stacked by the large volume stacker 200-3a, without transporting them to other apparatuses (e.g., apparatuses in following stages). The user can directly take out the printed materials for the stacker job that have been held at the discharge destination X, from the discharge destination X. This makes unnecessary a series of apparatus operations and user operations that transport the sheets to a most downstream discharge destination Z in the sheet transport direction of FIG. 3, and take out the printed materials from the discharge destination Z.

Furthermore, it is assumed that, in the system configuration in FIG. 3, the processing target job for which a printing execution request has been received from the user is a job in which a sheet process is instructed to be performed using the glue binding apparatus 200-3b (e.g., a glue binding process of either a case binding process or a pad binding process). This job is referred to as a "glue binding job". When processing the glue binding job using the system configuration in FIG. 3, the control unit 205 causes the sheets that have been printed by the printing apparatus 100 to be transported via the point A, a point A', and a point B in FIG. 3 into the glue binding apparatus 200-3b. Subsequently, the control unit 205 causes the glue binding apparatus 200-3b to perform a glue binding process in this job. Then, the control unit 205 causes a discharge destination Y inside the glue binding apparatus 200-3b to hold the printed materials on which the glue binding process has been performed by the glue binding apparatus 200-3b, without transporting them to other apparatuses (e.g., apparatuses in following stages).

Moreover, for example, it is assumed that the processing target job for which a printing execution request has been received from the user is a job in which a sheet process is instructed to be performed using the saddle stitching apparatus 200-3c. Examples of the sheet process using the saddle stitching apparatus 200-3c include saddle stitching, a punching process, a cutting process, a shift discharge process, a folding process, and the like. Here, this job is referred to as a "saddle stitching job". When processing the saddle stitching job using the system configuration in FIG. 3, the control unit 205 causes the sheets for this job that have been printed by the printing apparatus 100 to pass the point A, the point A', the point B, and a point C, and then to be transported into the saddle stitching apparatus 200-3c. Subsequently, the control unit 205 causes the saddle stitching apparatus 200-3c to perform a sheet process in this job. Then, the control unit 205 causes the discharge destination Z of the saddle stitching apparatus 200-3c to hold the printed materials for the saddle stitching job on which the sheet process has been performed by the saddle stitching apparatus 200-3c. Here, the discharge destination Z has a plurality of discharge destination candidates. This enables the saddle stitching apparatus 200-3c to perform a plurality of types of sheet processes and use different discharge destinations for the respective sheet processes.

Moreover, for example, it is assumed that, in this system, the processing target job for which a printing execution request has been received from the user is a job in which a sheet process is instructed to be performed using the inserter 200-3d. This job is referred to as an "inserter paper feed job". This inserter paper feed job can also use sheet processing apparatuses that are connected downstream thereof. Here, a case will be considered in which the inserter paper feed job is processed using the system in FIG. 3. In this case, the control unit 205 inserts sheets fed from the inserter 200-3d into the sheets for this job that have been printed by the printing apparatus 100, and then transports the sheets to the sheet processing apparatus according to a designated sheet process. Then, the sheet process is performed. In FIG. 3, the glue binding apparatus 200-3b and the saddle stitching apparatus 200-3c are connected downstream of the inserter 200-3d. Thus, a glue binding job and a saddle stitching job can be performed on sheets into which the sheets fed from the inserter 200-3d have been inserted. Furthermore, the inserter paper feed job does not necessarily require printing in the printing apparatus 100. That is to say, it is possible to transport only the sheets fed from the inserter 200-3d to the downstream, and perform a sheet process thereon using a designated sheet processing apparatus.

As described above, the printing system 1000 of this embodiment enables a plurality of sheet processing apparatuses to be connected to the printing apparatus 100. These plurality of sheet processing apparatuses can be connected to the printing apparatus 100 in any combination. The connection sequence of these plurality of sheet processing apparatuses can be freely changed as long as the sheet transport paths between the apparatuses are linked. Furthermore, there are a plurality of types of candidate sheet processing apparatuses that can be connected to the printing apparatus 100.

FIG. 4 is an external view of the operation unit 204 of the printing apparatus 100.

The operation unit 204 is provided with a touch panel section 401 and a key input section 402. The touch panel section 401 is provided with a liquid crystal display and a transparent electrode attached thereon, and displays various setting screens for receiving instructions from the user. The touch panel section 401 is provided with both a function of displaying various screens and an instruction input function of receiving instructions from the user. The key input section 402 is provided with an on/off key 501, a start key 503, a stop key 502, a user mode key 505, and a numeric keypad 506. The start key 503 is used when causing the printing apparatus 100 to start a copying job or a transmission job. The numeric keypad 506 is used when performing settings of numerical input of the number of prints or the like. Here, 604 denotes a key for instructing an off-line process. Furthermore, 609 denotes a key for performing settings of a sheet process. The control unit 205 controls the printing system 1000 such that various processes are performed based on user instructions received via the various screens displayed on the touch panel section 401 and user instructions received via the key input section 402.

FIG. 5 is a view showing a display example of a setting screen for enabling the user to select the type of a sheet process to be performed on the sheets that have been printed by the printing apparatus 100. This screen is displayed on the touch panel section 401 when the sheet process setting key 609 displayed on the touch panel section 401 is pressed by the user.

The screen in FIG. 5 is a setting screen configured so that the user can select the type of a sheet process that can be performed using the sheet processing apparatus 200 included in the printing system 1000. Upon receiving from the user via this screen the settings of the sheet process to be performed for the processing target job, the control unit 205 can cause the sheet processing apparatus 200 to perform the sheet process according to these settings. Here, in the case where the sheet processing apparatuses 200 are connected to the printing apparatus 100, a configuration may be adopted in which an operator can register information for specifying, for example, how many and what type of sheet processing apparatuses are to be connected in which sequence. For example, a case will be considered in which the printing system 1000 is configured as shown in FIG. 3. At that time, registration information is set indicating that the four sheet processing apparatuses consisting of the large volume stacker 200-3a, the inserter 200-3d, the glue binding apparatus 200-3b, and the saddle stitching apparatus 200-3c are connected to the printing apparatus 100 in the order as shown in the drawing. The control unit 205 holds information relating to the sheet processing apparatuses 200 set by the operator in the RAM 208 as system configuration information, and reads out and references the information as required. Accordingly, the control unit 205 can see how many and what type of sheet processing apparatuses are to be connected in which connection sequence to the printing apparatus 100.

Here, it is assumed that the user has performed a setting in which a saddle stitching apparatus 200-3c not having a straight path is connected among a plurality of sheet processing apparatuses. In this case, the control unit 205 causes an error display to be displayed on the touch panel section 401 in order to give notification to the effect that this setting is invalid. Furthermore, the control unit 205 may also cause guidance information to be displayed notifying the operator to connect the saddle stitching apparatus 200-3c at the endmost of the sequence without performing such a setting.

Next, various types of control performed by the control unit 205 according to this embodiment for the printing system 1000 will be described below. Here, the printing system 1000 is provided with the printing apparatus 100 having the printer unit 203 capable of performing a printing process of data in the HDD 209 that can store data of a plurality of jobs. Furthermore, the printing system 1000 is configured so that the printing apparatus 100 and a plurality of sheet processing apparatuses 200 can be connected. Each of these sheet processing apparatuses 200 is configured so that the operator can take out printed materials on which a sheet process has been performed by that apparatus, from the apparatus. Furthermore, the configuration is adopted in which sheets that have been set in the paper feed deck of the inserter 200-3d, which is one of the sheet processing apparatuses 200, can be selectively supplied from the inserter 200-3d to a plurality of sheet processing apparatuses 200. Furthermore, the printing system 1000 of this embodiment is configured so that sheets for a job on which printing has been performed by the printer unit 203 can be selectively supplied from the printer unit 203 to the plurality of sheet processing apparatuses 200. Meanwhile, the printing system 1000 has a function of processing a job using only the sheet processing apparatus 200 without using the printing apparatus 100 (a post-processing function for an off-line job).

FIG. 6 is a view showing a display example of a setting screen for enabling the user to select the type of a sheet process to be performed on supplied sheets using only the sheet processing apparatus 200 without using the printing apparatus 100.

This screen is displayed on the touch panel section 401 when the off-line process key 604 shown in FIG. 6 on the screen displayed on the touch panel section 401 is pressed by the user. This display process is controlled by the control unit 205. This screen is a setting screen configured so that the user can select the type of a sheet process that can be performed using the sheet processing apparatus 200 included in the printing system 1000. Upon receiving from the user via this screen the settings of the sheet process to be performed for the processing target job, the control unit 205 causes the sheet processing apparatus 200 to perform the sheet process according to these settings. Here, a paper feed key 601 is a soft key for performing settings of a paper feed unit that feeds sheets to be processed and/or the number of sheets that are to be fed. In the off-line process, printed sheets are not transmitted from the printing apparatus 100, and, thus, it is necessary to designate a paper feed unit that feeds sheets for the sheet process and the number of sheets.

Figure 7:
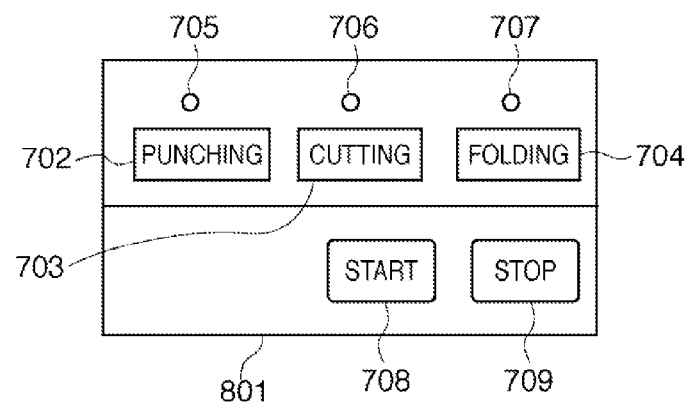
FIG. 7 is a view showing an example of a user interface provided in a saddle stitching apparatus.

FIG. 7 is a view showing an example of a user interface provided in the saddle stitching apparatus 200-3c according to this embodiment. In this user interface, the number of items that can be selected is smaller than the number of items in the user interface of the printing apparatus shown in FIG. 6.

In this diagram, 702, 703, and 704 denote keys for respectively designating punching, cutting, and folding as the off-line sheet processing mode of the saddle stitching apparatus 200-3c. Furthermore, each of 705 to 707 denotes an indicator for clearly indicating the off-line mode set in the saddle stitching apparatus 200-3c, and this indicator is lit when the corresponding mode is set. A start key 708 is a key for instructing start of an off-line process of the saddle stitching apparatus 200-3c in the designated sheet processing mode. A stop key 709 is a key for stopping a currently performed off-line process. Here, in this embodiment, the operation unit provided on the saddle stitching apparatus 200-3c will be described as an example of the second user interface, but the same can be applied to the case in which an operation unit is provided on other sheet processing apparatuses 200.

Figure 8:
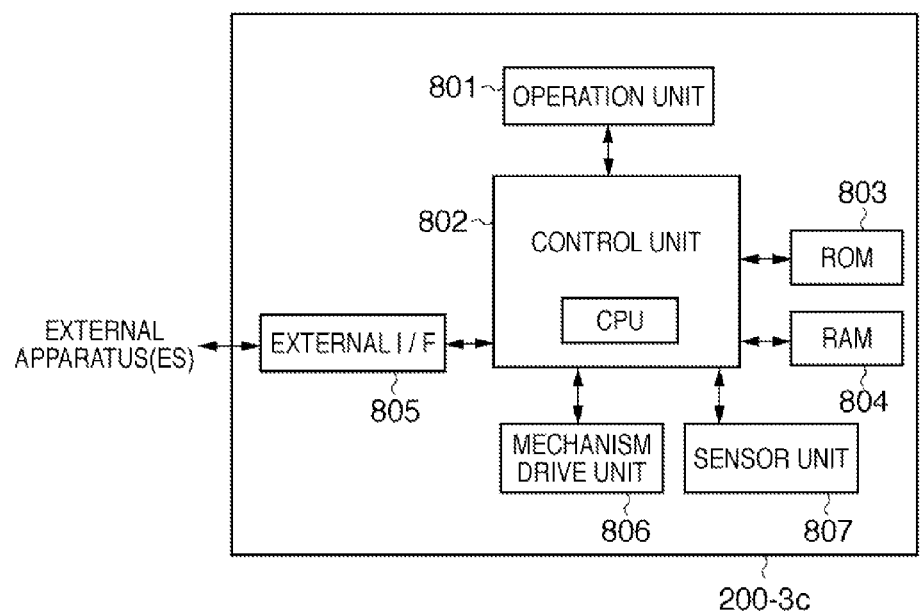
FIG. 8 is a block diagram showing the configuration of the saddle stitching apparatus according to this embodiment.

FIG. 8 is a block diagram showing the configuration of the saddle stitching apparatus 200-3c according to this embodiment.

An operation unit 801 constitutes part of the second user interface according to this embodiment. The operation unit 801 is provided on the saddle stitching apparatus 200-3c, and is used for giving an instruction relating to an off-line sheet process. A control unit 802 comprehensively controls the saddle stitching apparatus 200-3c. A ROM 803 stores programs to be executed by a CPU of the control unit 802. A RAM 804 is used as a work area when the CPU of the control unit 802 executes a control process, and used for storing various types of data. An external I/F 805 is an interface for performing communication with external apparatuses such as the printing apparatus 100. A mechanism drive unit 806 is a drive unit having a motor driver, a motor, and the like, and drives mechanism units of the saddle stitching apparatus 200-3c in response to instructions from the control unit 802. A sensor unit 807 plays a role of transmitting sensor information according to the status of the saddle stitching apparatus 200-3c to the control unit 802.

Figure 9:
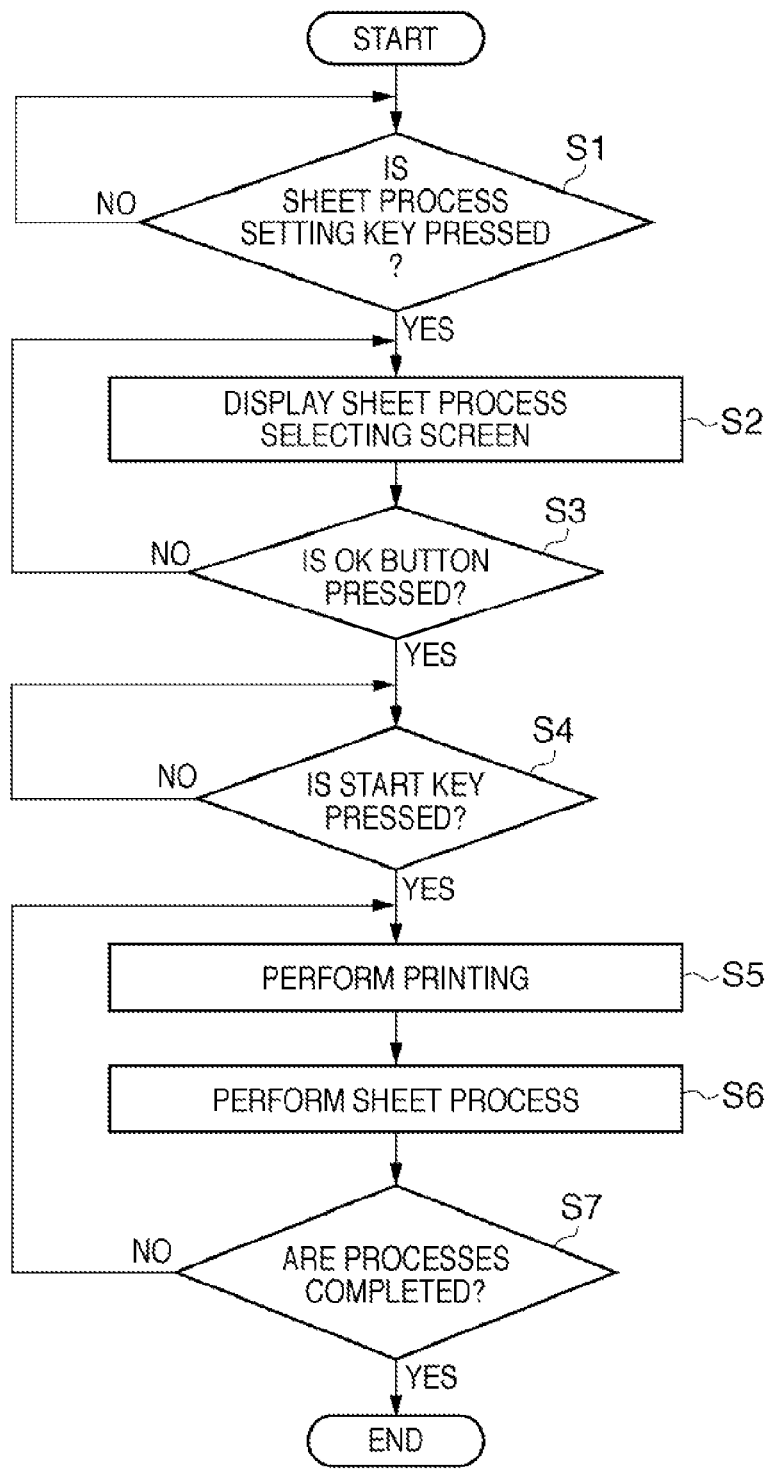
FIG. 9 is a flowchart illustrating an operation of a sheet process in the in-line job.

FIG. 9 is a flowchart illustrating an operation of a sheet process in the in-line job according to this embodiment.

This in-line job execution process is started when a copy key on the touch panel section 401 of the operation unit 204, which is the first user interface, of the printing apparatus 100 is pressed to set a copy mode. First, in S1, if the sheet process setting key 609 on the touch panel section 401 of the operation unit 204 (FIG. 4) is pressed, the procedure advances to S2. In S2, a screen for selecting a sheet process as shown in FIG. 5 is displayed. Here, if the user selects a desired sheet process and presses an "OK" button, the procedure advances from S3 to S4. In S4, if the start key 503 of the operation unit 204 is pressed, the procedure advances to S5. In S5, a document image is scanned by the scanner unit 201, and image data obtained by that scanning is transmitted to the printer unit 203 to perform a printing process. Sheets that have been printed by the printer unit 203 in this manner are transmitted to the sheet processing apparatus 200 under the control of the control unit 205, and the sheet process designated by the user in S2 is performed (S6). Then, in S7, it is determined whether or not the designated printing process and sheet process have been completed, and, if it is determined that the printing process has not been completed, the procedure returns to S5, and the above-described process is repeated. If it is determined in S7 that the sheet process for the print job has been completed, this process ends.

Figure 10:
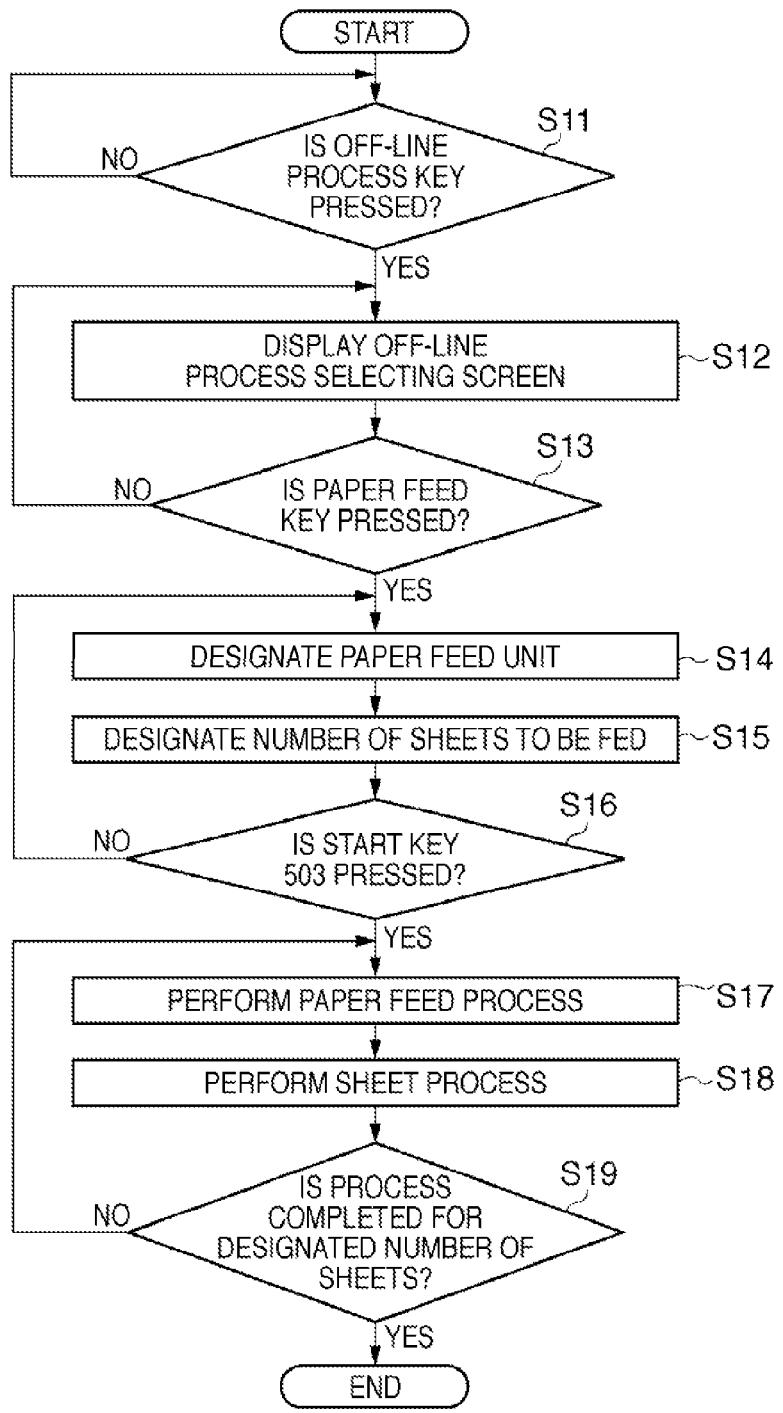
FIG. 10 is a flowchart illustrating a process in the off-line job according to this embodiment.

FIG. 10 is a flowchart illustrating a process in the off-line job according to this embodiment. Here, an operation of a sheet process in the off-line job instructed by the operation unit 204, which is the first user interface, of the printing apparatus 100 will be described.

Before starting this off-line job execution process, the user sets printed sheets on which the sheet process is to be performed, in the paper feed unit of the saddle stitching apparatus 200-3c. First, in S11, the procedure waits for the off-line process key 604 displayed on the touch panel section 401 of the operation unit 204 is to be pressed. If the off-line process key 604 is pressed, the procedure advances to S12 where the off-line process selecting screen shown in FIG. 6 is displayed on the touch panel section 401. The user operates this screen to select the type of a sheet process to be performed for the off-line job. Then, in S13, if the "paper feed" button 601 in FIG. 6 is pressed, the procedure advances from S13 to S14. In S14, a UI screen (not shown) is displayed. The user operates the UI screen to designate a paper feed unit. Moreover, in S15, the user can also operate the UI screen to designate the number of sheets that are to be fed. Here, if the user does not designate the number of sheets that are to be fed, it is desirable that the sheet process is performed until there is no more sheet in the paper feed unit designated in S14. If the settings of the sheet process in the off-line job have been completed in this manner, the user presses the "OK" button (FIG. 6) to definitely determine the type of a process in the off-line job.

Next, the procedure advances to S16, and, if the start key 503 of the operation unit 204 is pressed, start of the sheet process in the off-line job is instructed. The control unit 205 recognizes this instruction, and controls the operation of the sheet processing apparatus 200. In S17, the control unit 205 causes the paper feed unit designated in S14 to feed sheets. Then, the procedure advances to S18 where the off-line process designated in S12 is performed. Next, in S19, it is determined whether or not the sheet process has been completed for the number of sheets that are to be fed designated in S15, and, if it is determined that the sheet process for the designated number of sheets has not been completed, the procedure returns to S17, and the above-described process is repeated. Then, if it is determined in S19 that the sheet process for the designated number of sheets has been completed, the sheet process in the off-line job ends.

As described above, according to this embodiment, the sheet process together with the printing process (in-line job) and the sheet process in the off-line job can be set respectively using different UI screens of the first user interface. When the user presses the start button of the operation unit 204 of the printing apparatus 100, the designated in-line job or off-line job is performed.

Furthermore, the sheet process in the off-line job can also be performed using the user interface (the second user interface (FIG. 7)) provided on the saddle stitching apparatus 200-3c.

Figure 11:
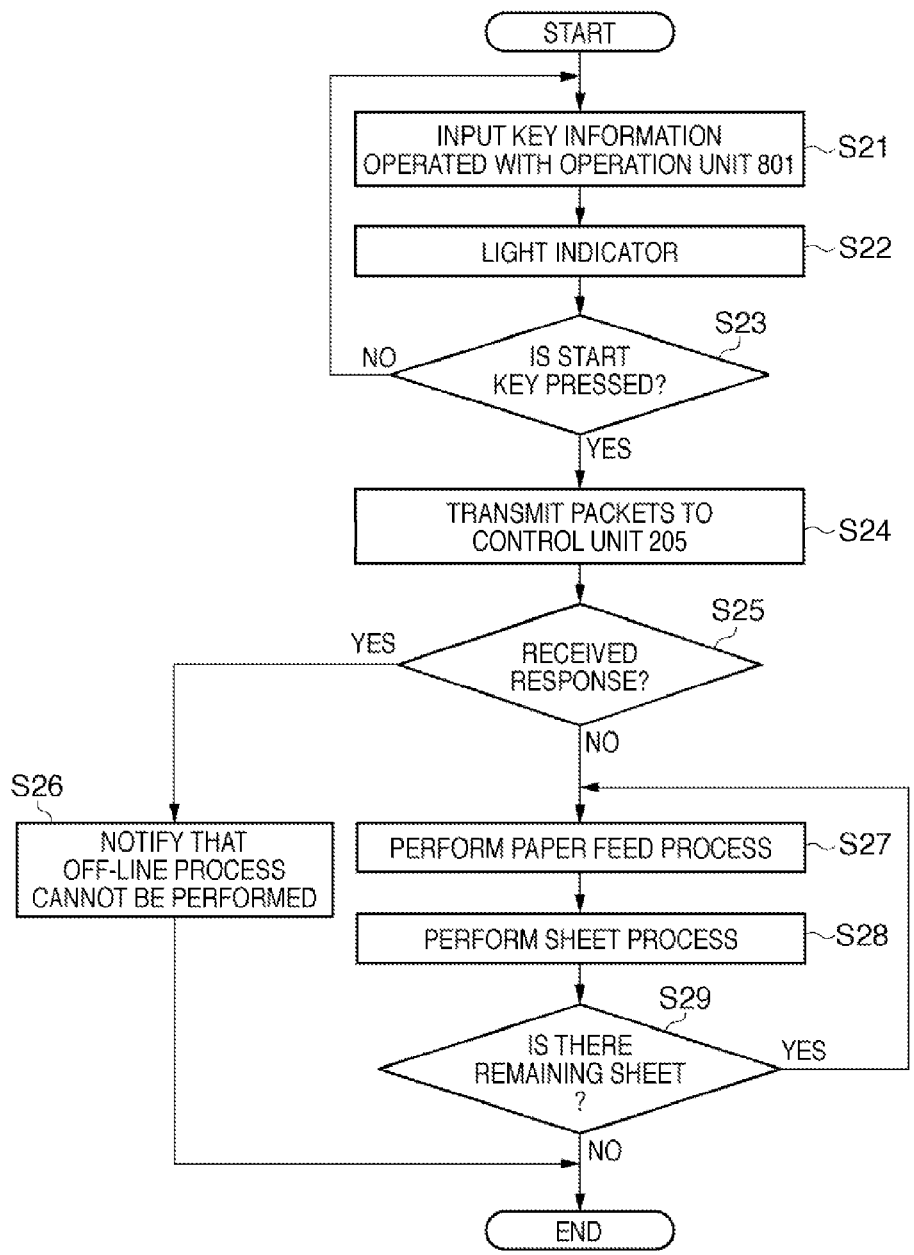
FIG. 11 is a flowchart of a sheet process in the off-line job using a second UI.

FIG. 11 is a flowchart illustrating a process using the saddle stitching apparatus 200-3c according to this embodiment.

Before performing this process, first, the user sets printed sheets in the paper feed unit. In this embodiment, constituent elements of the second user interface are limited to minimum necessary keys in order to reduce the cost, and, thus, there is no UI for designating a paper feed stage. Thus, the configuration is adopted in which the user sets printed sheets in an inserter provided on the saddle stitching apparatus 200-3c, but the present invention is not limited to this.

First, in S21, the user operates the operation unit 801 (FIG. 7), which is the second user interface, to select the type of a sheet process in the off-line job. Here, if the user desires a punching process, the punching key 702 is pressed. Accordingly, the indicator 705 is lit (S22) to indicate that the punching function is selected for the sheet process. Next, the procedure advances to S23 where it is determined whether or not the user has pressed the start key 708 of the operation unit 801, and, if the start key 708 is pressed, a command to perform the sheet process in the off-line job is given. If this command is recognized by the control unit 802, the procedure advances to S24 where the control unit 802 transmits packets via the external I/F 805 to the control unit 205 of the printing apparatus 100. The packets are transmitted in order to see whether or not the command of the operation unit 204, which is the first user interface, is given priority. Next, the procedure advances to S25 where it is determined whether or not a response has been received from the control unit 205 of the printing apparatus 100. If a response has been received, it can be determined that the command of first user interface is given priority. In this case, the procedure advances to S26 where the control unit 802 ignores the command to perform the sheet process input from the second user interface, and notifies the user that the off-line process cannot be performed. This notification is given, for example, by flashing the currently lit indicator 705 for a given length of time.

On the other hand, in S25, if no response has been received from the control unit 205 of the printing apparatus 100, the procedure advances to S27, and it is determined that the command of the second user interface can be performed. This state corresponds to, for example, a state in which use of the printing apparatus 100 is restricted due to power constraint of the printing apparatus 100 or other troubles. That is to say, in this case, even when the second interface instructs a post-process different from that instructed by the first interface, the post-process instructed by the second interface can be performed without any conflict. In S27, the control unit 802 performs the paper feed process. The paper feed process is performed when the control unit 802 issues a drive command to the mechanism drive unit 806, and the sensor unit 807 sequentially notifies information on the position of the sheets, the drive status of the motor, and the like. Next, the procedure advances to S28 where the control unit 802 performs a sheet process according to the type of the sheet process selected in S21. Next, in S29, it is determined whether or not any sheets remain in the paper feed unit of the saddle stitching apparatus 200-3c, and, if it is determined that a sheet remains, the procedure returns to S27, and the sheet process is repeated. On the other hand, if it is determined in S29 that no sheet remains, the sheet process in the off-line job ends.

As described above, according to this embodiment, a sheet process in the off-line job can be instructed using either the first user interface or the second user interface. However, usually, the operation unit of the second user interface of the sheet processing apparatus is simple, and, thus, the user uses UIs in different manners according to the purposes.

Furthermore, in this embodiment, the operation of the first user interface is given priority such that instructions from the first user interface and the second user interface do not conflict each other. Thus, when the user wants to use the second user interface in view of the operation efficiency, a power saving key of the key input section 402 may be pressed to put the printing apparatus 100 in a power constrained state. However, it will be appreciated that other methods may be used to cause the control unit 205 and the control unit 802 to communicate with each other, thereby performing operation control for controlling the operations thereof so as to prevent conflict therebetween.

Accordingly, the effects as described below are obtained.

(1) When an operator wants to use detailed operations or user support functions, it is possible to instruct a post-process in the off-line job using the first user interface that is a richer user interface. On the other hand, when the operator wants to perform more efficient operations with the minimum movement distance, it is possible to instruct a post-process in the off-line job using the second user interface provided on the post-processing apparatus.

(2) Even when use of the printing apparatus is restricted due to power constraint or other troubles, it is possible to instruct a post-process in the off-line job using the second user interface, and to perform the post-process.

(3) When use of the printing apparatus is not restricted, even if different post-processes in the off-line job are instructed by the first user interface and the second user interface, it is possible to perform the post-process without any conflict.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278942, filed Dec. 8, 2009, which is hereby incorporated by reference herein in its entirety.

What is claimed is:

1. A printing system including a printing apparatus and a sheet processing apparatus, comprising:
a first user interface unit configured to be provided on the printing apparatus and configured to receive a request for (i) executing a first type of job for printing an image on a sheet by the printing apparatus, (ii) conveying the sheet to the sheet processing apparatus by a conveying unit, and (iii) controlling the sheet processing apparatus to execute a sheet process on the sheet by the sheet processing apparatus; and
a second user interface unit configured to be provided on the sheet processing apparatus and configured to receive a request for executing a second type of job for executing a sheet process on a sheet by the sheet processing apparatus without printing an image on the sheet by the printing apparatus,
wherein the second type of job can be executed according to the request received by the second user interface unit while the printing apparatus is in a sleep mode, and
wherein a user operation via the first user interface unit is reflected on a touch panel display included in the first user interface unit, and a user operation via the second user interface unit, which is not provided with a touch panel display, is reflected on at least one of a plurality of indicators included in the second user interface unit.

2. The printing system according to claim 1, wherein printing by the printing apparatus is restricted while the printing apparatus is in the sleep mode.

3. The printing system according to claim 1, wherein the sleep mode is a mode for limiting power in the printing apparatus.

4. The printing system according to claim 1, wherein the second type of job is not executed, even if the second user interface unit receives the request while the printing apparatus is not in the sleep mode.

5. The printing system according to claim 4, further comprising a notification unit configured to notify a user that the second type of job cannot be executed in a case where the second type of job is not executed.

6. The printing system according to claim 1, wherein the sheet process executed by the sheet processing unit includes a stapling process, a cutting process, or a punching process.

7. The printing system according to claim 1, wherein the sheet process executed by the sheet processing unit includes a folding process, a cutting process, or a punching process.

8. A control method for controlling a printing system including a printing apparatus and a sheet processing apparatus, comprising:
receiving, in a first user interface unit provided on the printing apparatus, a request for (i) executing a first type of job for printing an image on a sheet by the printing apparatus, (ii) conveying the sheet to the sheet processing apparatus by a conveying unit, and (iii) controlling the sheet processing apparatus to execute a sheet process on the sheet by the sheet processing apparatus; and
receiving, in a second user interface unit provided on the sheet processing apparatus, a request for executing a second type of job for executing a sheet process on a sheet by the sheet processing apparatus without printing an image on the sheet by the printing apparatus,
wherein the second type of job can be executed according to the request received by the second user interface unit while the printing apparatus is in a sleep mode, and
wherein a user operation via the first user interface unit is reflected on a touch panel display included in the first user interface unit, and a user operation via the second user interface unit, which is not provided with a touch panel display, is reflected on at least one of a plurality of indicators included in the second user interface unit.

9. A non-transitory computer readable storage medium for storing a computer program for controlling a printing system including a printing apparatus and a sheet processing apparatus, the computer program causing a computer to:
receive, by a first user interface unit provided on the printing apparatus, a request for (i) executing a first type of job for printing an image on a sheet by the printing apparatus, (ii) conveying the sheet to the sheet processing apparatus by a conveying unit, and (iii) controlling the sheet processing apparatus to execute a sheet process on the sheet by the sheet processing apparatus; and
receive, by a second user interface unit provided on the sheet processing apparatus, a request for executing a second type of job for executing a sheet process on a sheet by the sheet processing apparatus without printing an image on the sheet by the printing apparatus,
wherein the second type of job can be executed according to the request received by the second user interface unit while the printing apparatus is in a sleep mode, and
wherein a user operation via the first user interface unit is reflected on a touch panel display included in the first user interface unit, and a user operation via the second user interface unit, which is not provided with a touch panel display, is reflected on at least one of a plurality of indicators included in the second user interface unit.

* * * * *